Sept. 17, 1963  O. L. NORDIN ETAL  3,104,121
HIGH PRESSURE SEAL ASSEMBLY

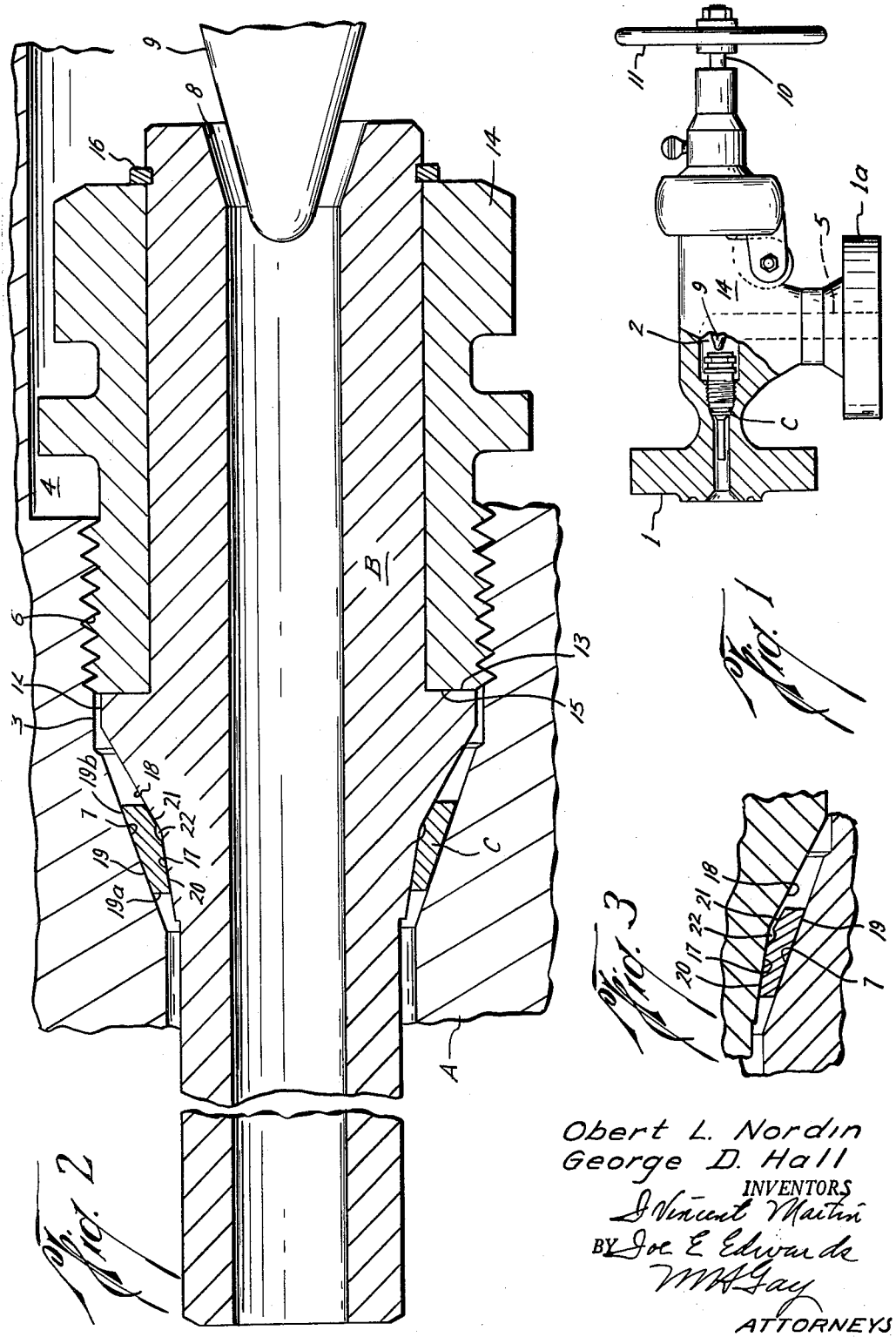

Filed May 5, 1960  2 Sheets-Sheet 2

Obert L. Nordin
George D. Hall
INVENTORS

BY

ATTORNEYS

— 
United States Patent Office
3,104,121
Patented Sept. 17, 1963

3,104,121
HIGH PRESSURE SEAL ASSEMBLY
Obert L. Nordin and George D. Hall, Houston, Tex., assignors to Thornhill-Craver Company, Inc., Houston, Tex., a corporation of Texas
Filed May 5, 1960, Ser. No. 27,216
7 Claims. (Cl. 285—332.3)

This invention relates to a new and useful improvement in a flow control device. More particularly, the invention relates to a high pressure sealing assembly having converging surfaces which co-act with a sealing element to maintain the seal regardless of direction of flow.

This seal assembly is designed to withstand pressures such as those encountered at high pressure well heads which may be in the order of 20,000 p.s.i. Under such conditions conventional material and equipment are inadequate to the task.

One object of this invention is to provide a high pressure seal assembly for a flow control device, wherein the assembly includes co-acting converging surfaces between the flow control device and the main body for accommodating a seal structure to provide an improved seal equally effective against pressure applied from either direction.

Another important object is to provide an assembly in which multiple surfaces co-act with a metal seal whereby the sealing assembly is capable of withstanding extreme pressures and throbbing or vibrating fluid shocks applied to either end of the assembly without the seal failing due to fatigue.

Another object is to provide a seal in which the converging sealing faces have a slow angle and a fast angle which are so arranged that the slow angle face moves parallel to, in non-sealing relationship to its complementary sealing face during make-up of assembly, and moves into final sealing engagement substantially simultaneously with the movement of the fast angle face into its final sealing position.

Other objects and advantages will be apparent from the detailed description in the following specification which is illustrated by the drawings wherein:

FIGURE 1 is a view partly in elevation and partly in cross section of a flow bean member sealed within a main body member.

FIGURE 2 is a cross section of the flow bean member and seal means, together with a fragment of the main body member.

FIGURE 3 illustrates the position of the seal means between the flow bean member and the main body member in hand tight engagement before the two members are brought into sealing engagement with the seal means.

Figure 4:
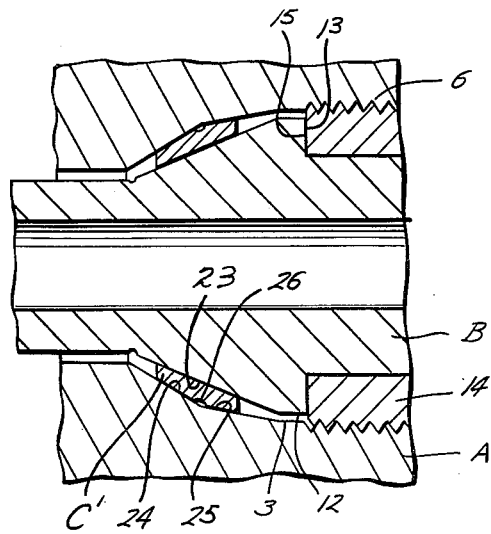
FIGURES 4 and 5 are fragmentary sectional views similar to FIGURE 2 illustrating modified forms of the invention.

In the drawings A refers to a main body having flanges 1 and 1a for connection at the well head in the usual Christmas Tree assembly as is well known in the art. This body has a bore 2 running from the center of flange 1 throughout the length of the body. The bore includes two enlarged chambers or counterbores as shown at 3 and 4. A flowway 5 communicates with this bore at right angles to the bore and through the center of flange 2.

In the first counterbore 3 threads 6 are provided to accommodate a flow bean B which will be described later in more detail. Between the threaded portion 6 and flange 1 is a sloping seat portion 7 which tapers outwardly from the bore toward the threaded portion of the counterbore.

A flow control member consisting of a tubular element or sleeve B, commonly known as a flow bean, having a bore extending entirely therethrough, is provided for mounting inside the bore. When in place within the bore of the main body, end 8 provides a valve seat for valve 9 which is regulated by means of the usual rotary shaft 10 operated by rotary wheel 11. The flow bean may alternatively be a positive choke and in this instance it is customary to replace the needle valve assembly with a blanking plug.

Intermediate the ends of the tubular sleeve or flow bean, an annular external enlargement 12 is formed. This enlargement has an annular flat shoulder 13 at one end thereof, while the external peripheral surface of said enlargement is shaped to provide a pair of sealing faces 17 and 18, which faces are tapered or cone-like. Slope 18 is of greater angle with respect to the axis of the flow bean than is slope 17. This change of slope, or angle, provides seating engagement for a seal element when placed between this portion of the flow bean, and the sloping section 7 of the main body previously described. The angles of the slope are such with respect to the slope of the face on the body that the faces are mutually convergent at their extremities. The slope of these faces constitutes and partially defines an annulus or opening between the main body and the flow bean having mutually converging but non-touching faces.

Flow bean B is held in place by means of nut 14 having threads for engagement with threads 6 of the main body. The face 15 of the nut abuts the annular flat shoulder 13 of the seal bean. A snap ring 16 secures the nut to the flow bean.

Figure 5:
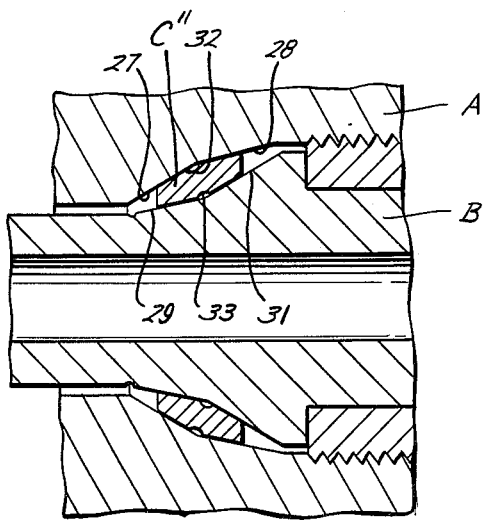

Seal C is a metal member which fits in the annulus between the main body and the flow bean. It is preferably of a material which is non-extrudible and capable of withstanding up to 20,000 p.s.i. or more; and which, when in place and seated, hasn't exceeded its elastic limits except possibly at the skin or surface of the body. Preferably, it is made of steel, although other metallic material may be acceptable. It is also preferably of one-piece construction. The seal has three contacting faces 19, 20 and 21. Face 19 co-acts with the sloping seat portion of the main body, while faces 20 and 21 co-act with corresponding seat portions on the flow beam. It should be noted that although this double angle seating surface is arranged on the flow bean, it is also possible to have the double angle appearing in the main body instead, with the seal being reversed as shown in FIG. 4. The choice is one of convenience due to the greater ease of machining the flow bean in this manner. It is also possible to have double angle faces in both members with of course a corresponding double angle annular seal as shown in FIGURE 5.

Relief portion 22 is indicated, but is not critical to this invention. As a practical matter it admits of tightly sealing the annulus even though the machining of the faces on the flow body and the flow bean is not perfect. It avoids the possibility of the crest of the seal making contact at other than the proper point on the flow bean in such a way as to prevent a perfect seal.

As shown, the seal is a polygon in cross section with each sealing face of the seal lying at a different angle with respect to each other. Surface 19 extends in a single straight line, however, due to the double angle at the surfaces 20 and 21, 19 really constitutes a double sealing face—one at each end of the surface. As such, it is proper to consider surface 19 as being really a pair of seal surfaces 19a and 19b and surface 20 and 21 as being another opposing pair of seal surfaces or faces.

FIGURE 3 illustrates the relative positions of the faces at hand tight position. Note that faces 7 and 19 as well as faces 17 and 20 are in contact. Faces 18 and 21 are parallel, but in standoff relationship with each other. When nut 14 is tightened the flow bean B slides axially through the main body member with the fast angle faces 18 and 21 just out of contact with each other until slow angle faces 17 and 20 are almost fully made up, at which time faces 18 and 21 also contact. Further tightening of the nut uniformly engages the seal at all faces. None of these sealing members is turned with respect to the other on tightening. Instead, the turning takes place between the flat face 15 of the nut and the flat side 13 of the enlarged portion of the flow bean. Because of the wedge relationship of the seal faces, a brake is provided which resists turning. By providing the two-piece flow bean greater forces may be applied to the seal than would be the case with a one-piece bean. It will be noted that the seal faces on the body and flow bean each form an acute angle with the axis of the bore of the body with respect to one end of the body.

In assembling the apparatus the flow bean with the seal thereon is first inserted in flowway or bore 2. Nut 14 is tightened by a suitable tool inserted through the closure end of the body. At hand tight relationship the seal C is in contact with both the bean and body excepting surfaces 18 and 21. Nut 14 is tightened to wedge the seal between surfaces 17 on the bean and 19 on the body to a degree which preferably will seal against the largest differential expected across the seal. As the parts approach final sealing position standoff surfaces 18 and 21 engage and begin to move relatively rapidly into sealing relation. Preferably, when the nut is fully tightened the seal C is wedged in both axial directions to an extent sufficient to seal in either direction against the largest differential expected. The force exerted by fluid pressure on the seal will also tend to wedge seal C into seating position and this force provides a safety factor to insure proper sealing.

Thereafter the needle valve is installed. As the seal is effective against a differential in either direction, the body A may be made up with either flange 1 or flange 1a secured to the high pressure fluid source at the choice of the user.

In FIGURE 4 the structure is illustrated with the double angle in the seal C' and the straight surface on the flow bean B. In this instance the flow bean has a single conical surface 23 and the body A has a pair of seal surfaces 24 and 25.

The seal C' has complementary surfaces engaging the surfaces 23, 24 and 25. A relief 26 is provided in the external periphery of the seal ring to overlie the juncture between surfaces 24 and 25 on the body.

In FIGURE 5 a form of this invention is shown in which multiple seal surfaces are provided on both the flow bean B and the body A. The body A is provided with conical seal surfaces 27 and 28. These surfaces are formed on different angles. Likewise the flow bean B has seal surfaces 29 and 31 which are formed on different angles. All of the seal surfaces form acute angles with respect to one end of the flow bean.

The seal member C" has surfaces complementary to the surfaces 27, 28, 29 and 31. A relief 32 is provided in the external surface of the seal to overlie the juncture between surfaces 27 and 28. Likewise, a relief 33 is provided in the internal surface of the seal to overlie the juncture between seal surfaces 29 and 31 on the flow bean.

The foregoing disclosure and description of the invention is illustrative and explanatory thereof and various changes in the size, shape and materials within only such limits as are specifically mentioned, as well as the details of the illustrated construction may be made within the scope of the appended claims without departing from the spirit of the invention.

We claim:

1. A high pressure seal assembly comprising,
a main body member having a bore therethrough,
a flow control member,
means securing the flow control member within the bore,
the outer diameter of said flow control member being smaller than the diameter of said bore along a portion of its length to provide an annulus,
an annular sealing surface on the outer periphery of the flow control member in part defining said annulus,
an annular sealing surface in the bore of the main body member in part defining said annulus,
at least one of said sealing surfaces having a pair of sealing faces extending at different angles relative to the axis of the flow control member,
all of said sealing faces lying at an acute angular relationship with respect to the axis of the flow control member when said members are assembled,
said faces on the flow control member converging in opposite directions with the sealing faces on the main body member,
unitary annular non-extrudible metallic seal means in said annulus sealing the annulus between said body and said control member, said seal means being capable of withstanding high pressures,
said seal means having sealing faces complementary to and engaging the sealing faces of said members.

2. The assembly of claim 1 wherein a groove is provided at the juncture of at least one pair of sealing faces to prevent galling between confronting sealing faces.

3. The assembly of claim 1 wherein the greater angle face of said pair of faces extending at different angles and the complementary face on the seal member move into engagement substantially simultaneously as the lesser angle face of said pair and the complementary face on the seal member move into final sealing position as the assembly is made up.

4. The assembly of claim 1 wherein the sealing surface on the flow control member is provided with a pair of faces extending at different angles, and the greater angle face of said pair of faces and the complementary face on the seal member move into engagement substantially simultaneously as the lesser angle face of said pair and the complementary face on the seal member move into final sealing position as the assembly is made up, and an annular groove is provided in the inner periphery of the seal at the juncture between the sealing faces thereon to prevent galling.

5. As a subcombination,
a flow control member adapted to be secured in a bore through a main body member,
and seal means for sealing between the flow control member and bore,
said flow control member having a section smaller in diameter than the bore through the main body member to provide an annulus for receiving said seal means,
said seal means comprising a unitary annular non-extrudible metallic seal capable of withstanding high pressures,
said seal having an annular sealing surface on its outer periphery for sealing with a complementary sealing surface in the bore of said main body member and an annular sealing surface on its inner periphery for sealing with a complementary sealing surface on said section of the flow control member,
at least one of said sealing surfaces on said seal having a pair of sealing faces, the sealing faces of at least one of said pair extending at different angles relative to the axis of the seal,
all of said sealing faces on the seal lying at an acute angular relationship with respect to the axis of the seal, said faces on the inner periphery of the seal converging in opposite directions with the sealing faces on the outer periphery of the seal.

6. The subcombination of claim 5 wherein an annular groove is provided in the seal at the uncture of a pair of said sealing faces.

7. The subcombination of claim 5 wherein the sealing surface on the inner periphery of the seal has the pair of sealing faces extending at different angles and the sealing surface on the outer periphery of the seal extends at a constant angle relative to the axis of the seal, and a groove is provided in the inner periphery of the seal at the juncture between the sealing faces thereon to prevent galling.

References Cited in the file of this patent

UNITED STATES PATENTS

| | | |
|---|---|---|
| 1,014,053 | Dolensky | Jan. 9, 1912 |
| 1,619,969 | Champion | Mar. 8, 1927 |
| 1,718,771 | Baker | June 25, 1929 |
| 2,068,334 | Kusebauch | Jan. 19, 1937 |
| 2,079,646 | Abegg | May 11, 1937 |
| 2,181,343 | Reimschissel | Nov. 28, 1939 |
| 2,760,673 | Laurent | Aug. 28, 1956 |
| 2,766,999 | Watts | Oct. 16, 1956 |

FOREIGN PATENTS

| | | |
|---|---|---|
| 889,819 | France | Oct. 18, 1943 |